W. O. ROY.
METHOD OF TRAINING TREES.
APPLICATION FILED APR. 26, 1920.

1,436,198.

Patented Nov. 21, 1922.

Inventor
William Ormiston Roy.
By his Attorney
Andrew Wilson.

Patented Nov. 21, 1922.                                                         1,436,198

UNITED STATES PATENT OFFICE.

WILLIAM ORMISTON ROY, OF MONTREAL, QUEBEC, CANADA.

METHOD OF TRAINING TREES.

Application filed April 26, 1920. Serial No. 376,444.

*To all whom it may concern:*

Be it known that I, WILLIAM ORMISTON ROY, a subject of the King of Great Britain, residing at Montreal, Province of Quebec, Dominion of Canada, have invented certain new and useful Improvements in the Methods of Training Trees, of which the following is a specification.

Figure 1:
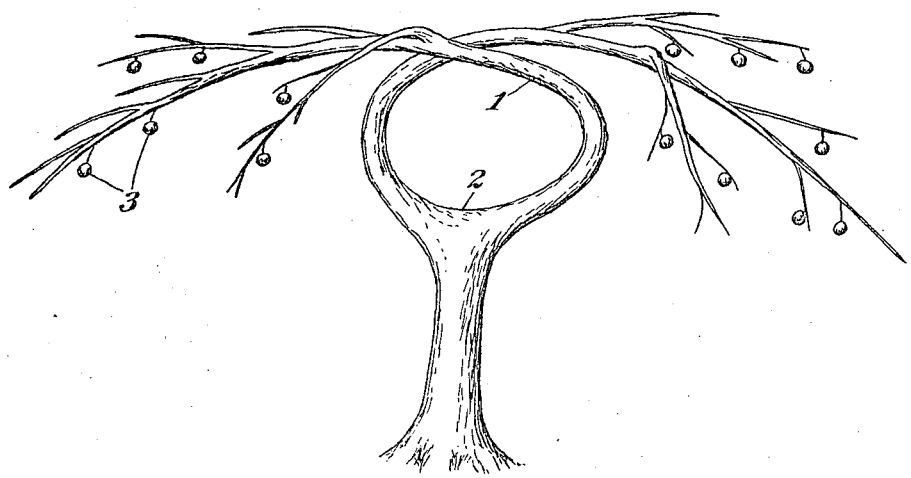
Figure 2:
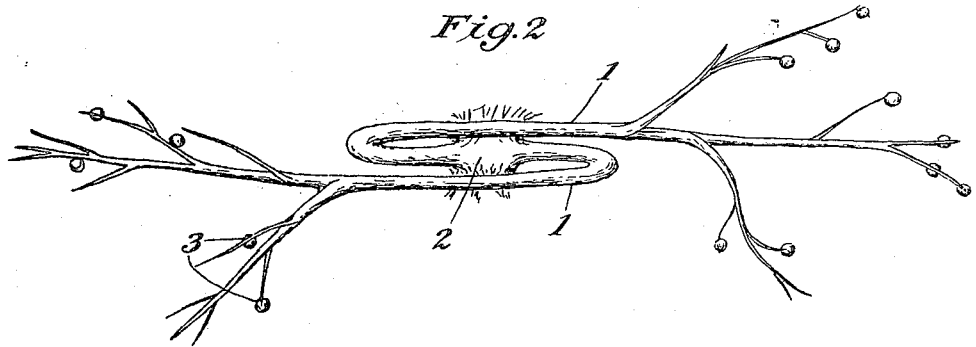

My invention relates to an improved method of training the branches of trees, especially fruit trees, so that their ability to carry a burden of moisture, snow, ice or fruit will be increased without detracting from the vigor and fruitfulness of the trees, and the particulars of my improvements I will now proceed to point out and claim, referring, in so doing, to the accompanying drawings in which I have shown a fruit tree which has been trained in accordance with my improved method, the leaves being omitted for clearness, Fig. 1 being an elevation and Fig. 2 a plan view.

As is well known by those accustomed to the cultivation and care of trees, the load to which the branches are at times subjected, whether of snow or ice or the fruit which is sometimes developed on prolific specimens, is sufficient to break down or split off the branches. Certain varieties, such as the peach, for instance, are peculiarly liable to be thus injured, the branches being frequently split down from the trunk so as to seriously damage or ruin the trees. This is due to the fact that the woody fibres in the upper angle or crotch between the branch and the trunk of the tree are not sufficiently strong to resist the splitting strain to which the bending down of the branch by its load subjects them, the grain of the wood being subjected to a transverse tearing or separating strain which it is unable to carry. And this danger is materially increased when the tree is so trained as to be kept close to the ground with its branches widely extended.

If, however, the weight on the branch can be made to draw the upper side of the branch toward the trunk so as to compress the fibres in the angle or crotch referred to, the tendency of splitting at that point will be done away with, and the branch will be able to carry a heavy load without risk of splitting off from the trunk.

I accomplish these desirable results by cutting off the main leader and allowing two or more leaders to develop instead, bending the new leaders or branches 1, when still young and pliable, upward, in toward and past the center 2 and outward on the opposite sides of the trunk from their points of union therewith, and holding them so until they have become set and will continue to grow in their new positions, care being taken to dispose the branches so that they will not chafe each other.

And while this results in turning the branches over, yet they will soon adapt themselves to their new positions and thrive as well as in their original positions.

When, then, the fruit, 3, develops upon the branches, or they are weighted down with snow or ice, the effect will be to pull the original upper sides of the branches in toward the tree, and, as a similar action is exerted by all of the cross-over branches, their cumulative effect will be to pull the crown of the tree together instead of spreading it apart and straining or rupturing its fibres at the crotch. A similar effect is produced between the branches and the shoots from their upper sides. Any suitable appliances may be employed by those familiar with the art for facilitating the holding of the branches while they are being trained into their new positions. Thus the branches may be held in place by twine or cords or otherwise secured in such wise as to hold them in the desired positions without injuring them. The particular mechanical means, however, may be selected by the operator, so long as he proceeds within the lines I have indicated.

In the subsequent growth of the tree, the underlying principle of my invention may be still further applied by pruning off the shoots from the lower sides of the branches and retaining those from the upper sides, so that the load on the branches and their shoots will always tend to close up and not to split open the crotches, whether at the main trunk or elsewhere throughout the tree.

By means of my improved method of training I am enabled to keep the crown of the tree low with its branches extended and near the ground, greatly facilitating the work of pruning, thinning, spraying and picking fruit, and otherwise caring for the tree, as, if my method is properly applied, it is practicable to have a tree in full bearing all parts of which may be reached by a person standing on the ground beneath it.

The practical advantage of this will be readily appreciated by all those who are interested in arboriculture.

Having thus described my invention what I claim and desire to secure by Letters Patent of the United States is:—

1. The improved method of training self supporting trees, consisting in bending a plurality of leaders or branches severally upward, over and past the center of the tree and holding them so until nature sets them in that position, so that the normal tendency of each leader will be to draw together the crotch adjacent to it.

2. The improved method of training self supporting trees, consisting in cutting off the main leader, allowing a plurality of new leaders to develop, bending the new leaders severally over and past the center of the tree, and holding them so until nature sets them in that position, so that the normal tendency of each leader will be to draw together the crotch adjacent to it.

WILLIAM ORMISTON ROY.